S. C. BARR.
EYE TESTING MECHANISM.
APPLICATION FILED MAR. 25, 1918.

1,345,573.

Patented July 6, 1920.
4 SHEETS—SHEET 2.

Witness
A. Sundell

Inventor
Samuel C. Barr,
C. C. Shepherd
By
Attorney

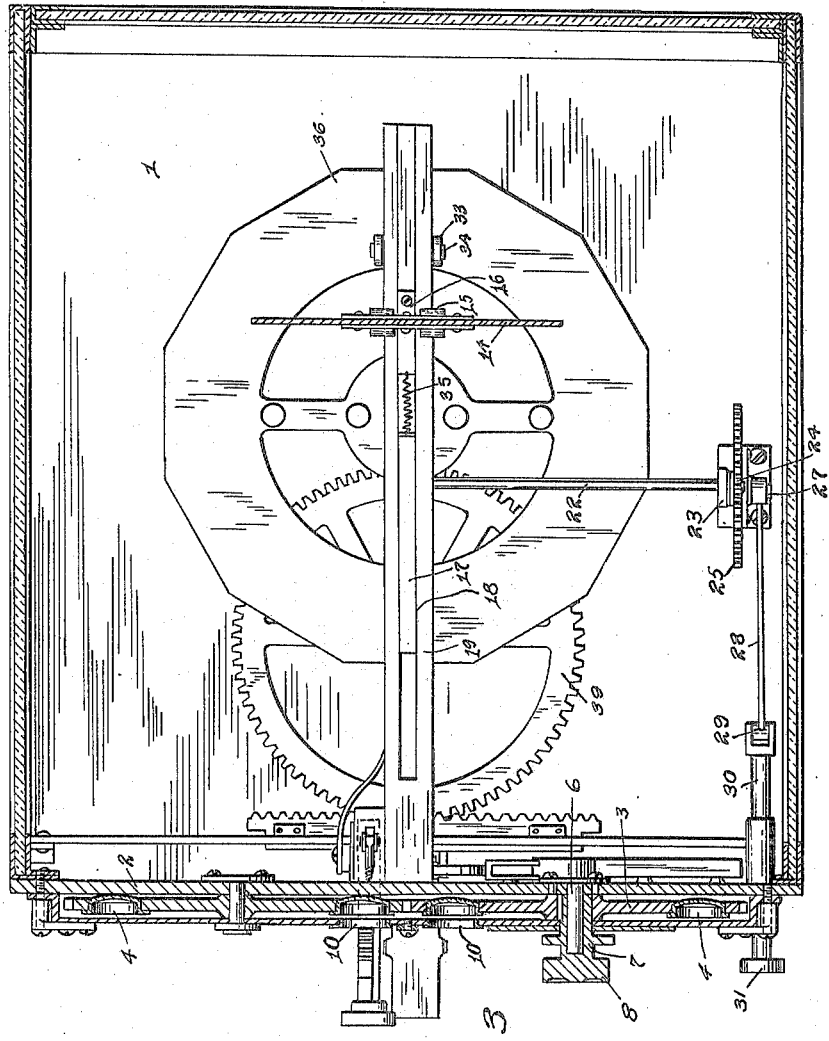

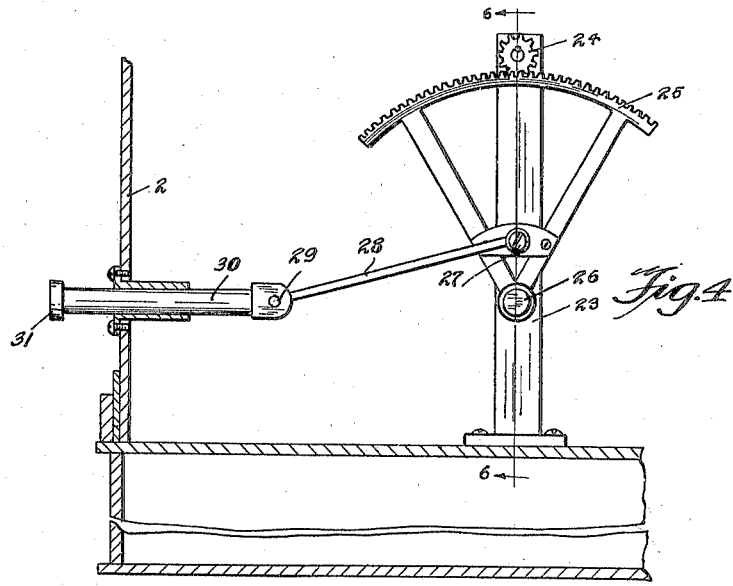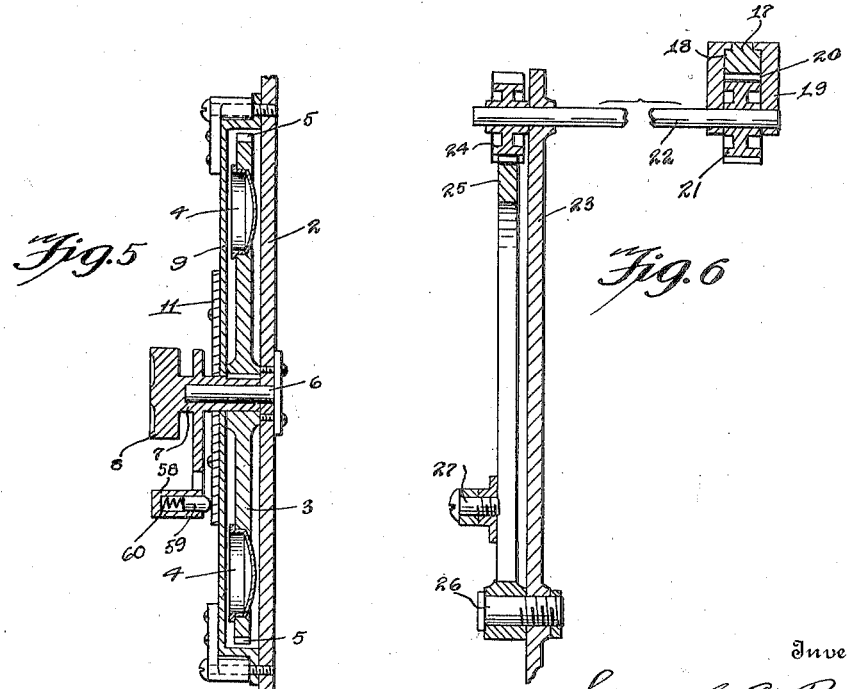

UNITED STATES PATENT OFFICE.

SAMUEL C. BARR, OF CHILLICOTHE, OHIO, ASSIGNOR TO THE BARR COMPANY, A CORPORATION OF OHIO.

EYE-TESTING MECHANISM.

1,345,573.	Specification of Letters Patent.	Patented July 6, 1920.

Original application filed November 27, 1916, Serial No. 133,546. Divided and this application filed March 25, 1918. Serial No. 224,487.

*To all whom it may concern:*

Be it known that I, SAMUEL C. BARR, a citizen of the United States, residing at Chillicothe, in the county of Ross and State of Ohio, have invented certain new and useful Improvements in Eye-Testing Mechanism, of which the following is a specification.

This invention relates to eye testing mechanism, and has particular reference to an improved structure for permitting a person to personally test his eyes, so as to be able to accurately determine in a convenient and simple manner the desired character of lens particularly suited for his individual requirements.

Another object of the invention is to provide mechanism for permitting a person to thoroughly and efficiently test his eyes with the view of obtaining proper eye glass lens and without employing the services of a skilled optician or oculist to obtain the desired fitting.

Another object of the invention resides in means whereby a patron may test the eyes as to various focal lengths and also may test them as to distance, and to provide other tests whereby the patron will be assured of obtaining properly fitting lenses.

A further object of the invention rests in the provision of a means whereby only one eye may be tested, if desired, at one operation so as to enable the patron to determine whether both eyes are defective in the same manner or not, and to thereby obtain a different correction of either eye.

At this juncture, attention is called to the fact that this invention forms a true division of the mechanism shown in my co-pending application for improvements in vending machines, Serial Number 133,546, filed November 27, 1916, the present invention relating specifically to the eye testing mechanism of said parent application.

The preferred embodiment of the present invention is shown in the accompanying sheets of drawings, in which similar characters of reference denote corresponding parts.

Fig. 3 is a horizontal sectional view taken along the line 3—3 of Fig. 2.

Fig. 4 is a detailed sectional view disclosing the means for adjusting the tester card.

Fig. 5 is a vertical sectional view taken through one of the disks shown at the right of Fig. 1, the plane of the section being represented by the line 5—5 of Fig. 1.

Fig. 6 is a detailed sectional view taken along the line 6—6 of Fig. 4.

Figure 1:
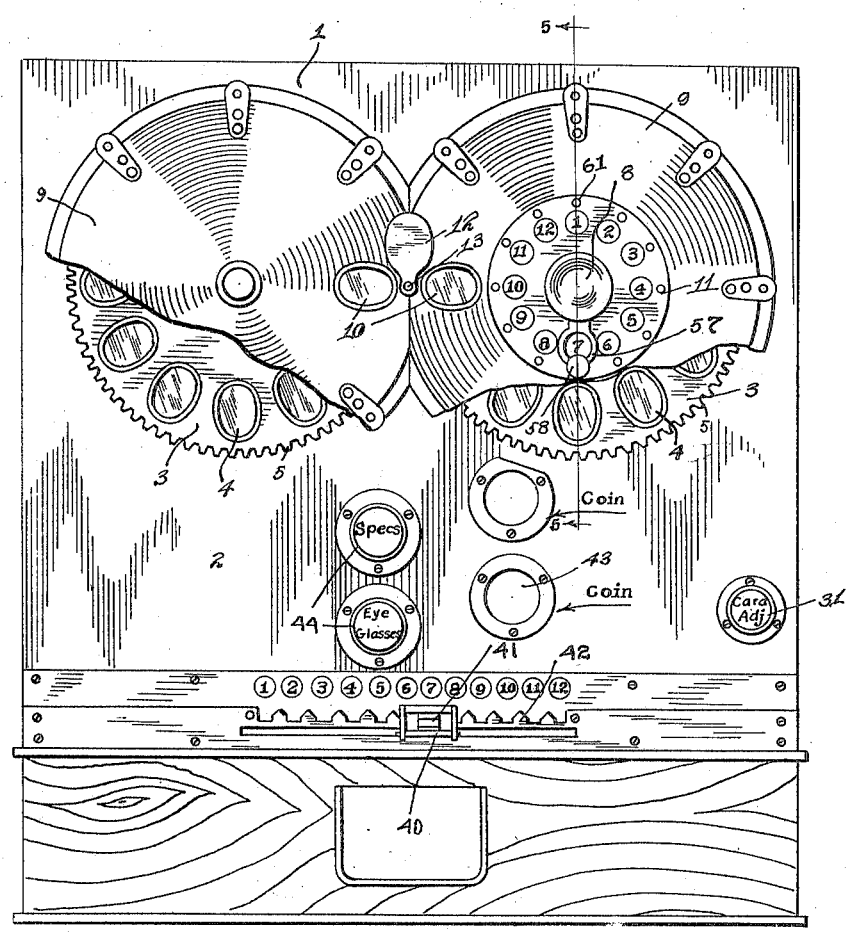
Figure 1 is a front view of the housing employed by the eye testing mechanism.
Figure 2:
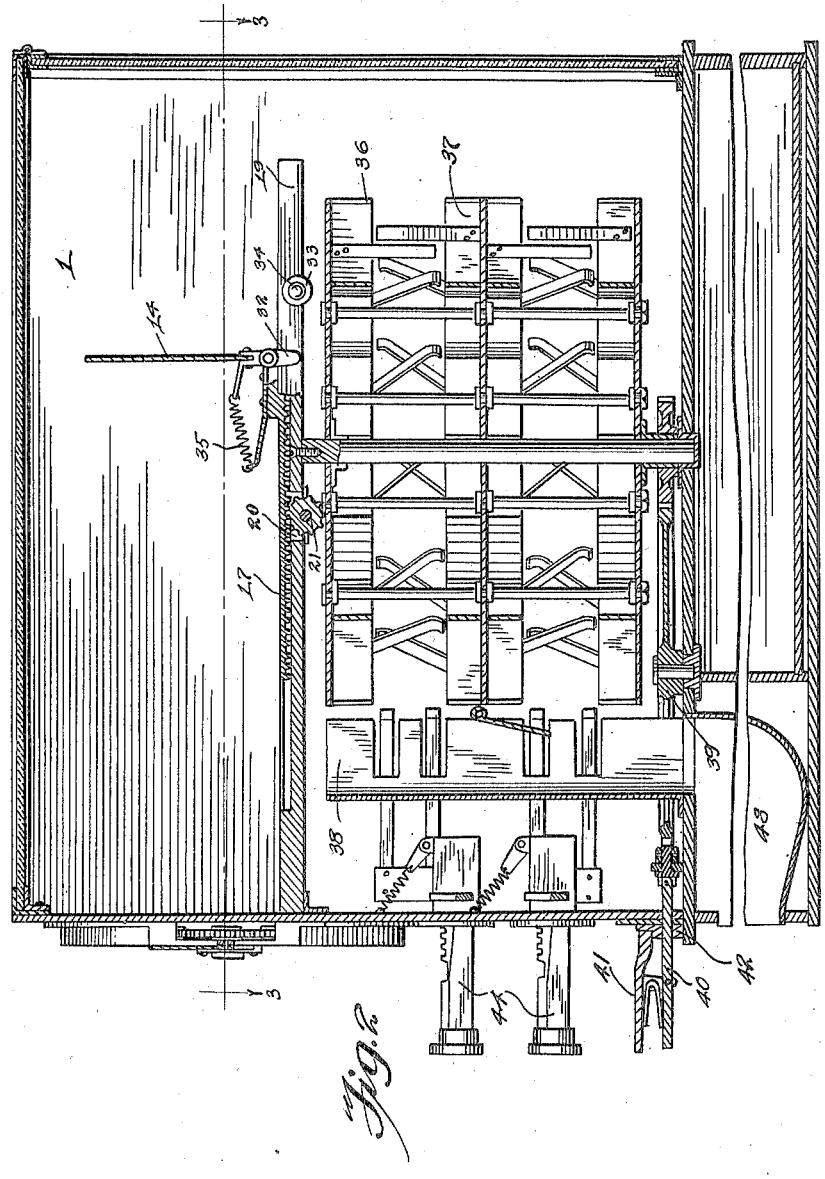
Fig. 2 is a vertical transverse sectional view taken through the eye testing mechanism and also disclosing certain vending features employed in conjunction with the testing mechanism.

The entire structure is preferably mounted within the interior of a casing 1, whose top, two sides and rear end are preferably made of glass, as is shown, and suitably assembled to present a rigid construction. The front wall 2 is preferably of metal construction and carries a plurality of supporting disks 3, which disks are each provided with a plurality of concentrically disposed openings 4, in which the test lenses are suitably supported. These test lenses are all of varying properties and the two disks are each provided with a series of gear teeth 5, so that rotation of one will cause a corresponding rotation of the other in order to successively present a pair of lenses of different properties, whereby a patron may test his own eyes. The structure for supporting these disks is best shown in Fig. 5, in which it will be seen that the front wall 2 is provided with a stud 6 upon which the sleeve 7 is rotatably mounted. To each of these sleeves, the respective disks 3 are rigidly secured and on the outside end of the sleeve, upon which the disk shown to the right of Fig. 1 is mounted, there is provided a knob 8, so that the user may readily turn the same. It will of course be appreciated that the knob 8 may be mounted upon one or the other of the stub shafts supporting the disks 3. Each disk is further provided with a cover plate 9, secured in position in any desired manner, and which cover plate is in turn provided with an eye opening 10 arranged side by side, as is shown, and it is through these openings 10 that the patron may look when testing the eye. The cover plate 9, in this instance, shown to the right of Fig. 1, is also provided with an index dial 11 which, in the present case, is numbered from 1 to 12, which is the number of test lenses to be found in each of the disks 3. Should the patron desire to test only one eye at one time, the cover plate 12 may be swung to a position to cover either of the openings 10, since this cover plate is pivotally mounted at its lower end, as shown at 13. In this manner, both eyes may be tested, but this test may not necessarily be simultaneous. It will, therefore, appear that as the knob 8 is turned, successive pairs of lenses are presented beneath the openings 10 and if these test lenses are all of different properties, the patron may readily determine which set suits his eyes to the best advantage.

In direct testing alinement with the openings 10 and within the cabinet 1, there is mounted a testing card 14, which testing card is designed to be adjusted either forward or backward to present different focal lengths, as may meet the requirements of the patron. To accomplish this, I have mounted the card 14 upon a hinge member 15 at its lower end, and this hinge member is in turn hingedly mounted to a base 16, this latter being in rigid connection with the rack shown at 17. The rack is in slidable engagement with a guideway 18 in a guide member 19, which latter extends from the front wall of the casing rearwardly. The rack 17 is designed to be moved back and forth within the guideway 18 and in this manner, the card 14 is moved toward or away from the particular lenses which happen to be in back of the openings 10.

In order to accomplish this adjustment, the underside of the guide member 19 is slotted as shown at 20, and in this slotted portion a pinion 21 is designed to operate. This pinion is in engagement with the rack bar 17 and is mounted upon a shaft 22 which extends laterally, and is journaled at its outer end in an upstanding standard 23. The end beyond the standard 23 is also provided with a pinion 24 which is designed to operate in conjunction with a segmental rack 25 pivotally mounted to the standard 23, as shown at 26. This segmental rack is in turn pivotally connected at 27 with a link 28, the other end of which link being pivotally mounted as at 29 in connection with a push rod 30, whose head portion 31 projects beyond the front wall of the casing. Thus, by pulling on the portion 31, or by pressing the same inwardly, the segmental rack 25 will cause a rotation of the shaft 22 by means of the pinion 24, and this in turn causes the pinion 21 to be rotated to move the rack 17 back and forth in its guideway 18.

Should the patron desire a test for distance, means are provided whereby the tester card 14 is withdrawn from view, and inasmuch as the rear of the cabinet is made of glass, a similar card may be placed in a remote position in testing alinement with the testing lenses, or an arrangement of mirrors (not shown) may be resorted to. In the present instance, the hinge member 15 of the testing card 14 is provided with a depending finger 32 projecting beneath the hinge portion, or in such position as to engage the roller 33 mounted upon a stud 34 on the rear end of the guide member 19. The card 14 is, itself, normally held in upright position by means of a spring 35, but when the plunger 30 is pulled out a sufficient distance, the indicator card will have moved rearwardly a distance to bring the finger 32 thereof into engagement with the roller or other projection 33. Continued movement causes the card 14 to turn down against the pressure of a spring 35, thus removing it from interference, for a distance test.

The manner of operating the structure thus far described is as follows: The knob 8 is grasped and as the patron looks through the openings 10 on to the tester card 14, a succession of lenses of different types or characters are presented for view. When the most desirable lens or lenses has been determined upon to suit the particular requirements of said patron, the latter takes note of the position of the arm 57 carried by the knob 8. It will be noted that this arm 57 is rigid with the knob 8 and carries a socketed portion 58 at its lower end, and within this portion there is operatively positioned a plunger 59, which is normally forced outwardly by means of the coiled spring 60. This plunger, therefore, resiliently seats itself in any of the pockets 61 found in the dial plate 11 as the knob 8 is turned, so that when the desired lenses appear through the openings 10, the patron takes note of the number on the dial 11 over which the arm 57 operates, for a purpose to be hereinafter set forth. During the operation of testing the eyes for the most desirable type of lenses, the patron may also adjust the tester card 14 to suit his desires, or in other words, to secure the best pair of lenses particularly adapted for his personal requirements. To do this, the knob 31 is pulled or pushed, as desired, which correspondingly moves the tester card through the link connection 28, segmental gear 25, pinion 24, shaft 22, pinion 21 and rack bar 17, which therefore reciprocates said tester card into focal coincidence with the pair of lenses situated to the rear of the openings 10. To obtain a distance adjustment, the knob 31 is pulled completely outward, which causes the tester card 14 to assume a horizontal position against the tension of the spring 25 by bringing the finger 32 into engagement with the roller 33.

As before stated, this testing mechanism is adapted to be employed in connection with the vending machine, so that a purchaser may obtain a pair of glasses adapted for his own requirements without consulting and incurring the expense of a skilled optician. Through the use of the testing mechanism, the purchaser or patron may readily determine the character of lenses best adapted for his purposes, and these lenses may then be determined by referring to the numerals found upon the dial 11. Then by use of a vending machine, lenses corresponding to the numbers upon said dial may be obtained by the purchaser through the insertion of a proper coin. In my co-pending application, above referred to, I have clearly shown and claimed the type of vending machine which I now consider to be best adapted for the purpose of vending glasses in connection with the testing mechanism described, but it will be understood, that the present invention is not limited to use in connection with this specific embodiment of vending mechanism. In the accompanying drawings, forming a part of this specification, I have for purposes of illustration shown the form of vending mechanism above discussed and the following description is offered relative to its operation.

In order to link and identify my former patent application above mentioned with the present application, it is thought advisable to state that this vending mechanism broadly consists of a rotatable cage or lens carrier 36, which is provided with a plurality of compartments 37 for the reception of suitable packages containing lenses to be vended, each compartment of course being adapted to contain lenses of a certain, definite character. After the proper lens has been determined through the provision of the eye testing mechanism above described, the cage is rotated so that the compartment containing a desired lens is brought into registration with a discharging chute 38. The rotation of a cage is effected through suitable gearing 39, which is operated by use of a handle 40, located to extend through the front of the machine, said handle being provided with a spring pressed catch 41, disposed to engage with a numbered rack bar 42. The numbers of the rack bar correspond with the numbers found upon the dial plate 11, so that after the purchaser has decided upon a desired type of lens he will take note of the number viewed through the member 57. Then the handle 40 is reciprocated so that the catch 41 thereof will engage at such position upon said rack bar as will correspond in number to that viewed through the member 57. After this has been accomplished a coin is inserted into one of the slots 43, which permits of the operation of one of a plurality of plunger elements 44, which elements are so constructed as to engage with the packages situated within the compartments 37, so as to eject said packages into the discharge chute 38, whence the packages may be obtained through the provision of a front wall opening 45.

Thus it will be apparent that upon desiring a pair of glasses, a patron first tests his eyes by turning the knob 8 until he ascertains a proper lens number. The handle 40 and the catch 41 are then operated to revolve the cage structure 36 so that the proper compartment 37 thereof will be alined with the chute 38. The patron next deposits a proper coin into one of the coin slots 43, depending upon the character of glasses desired, and after this has been accomplished the proper plunger element 44 is operated to effect the discharge of the glasses into a position of convenient collection.

What I claim is:

1. In a machine of the character described, a test lens holding means rotatably mounted to present a successive array of lenses of varying properties, a testing card in proper alinement with the line of vision as said lenses are successively presented, a slidably mounted rack upon which said card is mounted, a pinion in mesh with said rack, a segmental rack operatively connected to said pinion, and means operable from the outside of said machine for oscillating said segmental rack to move said card back and forth.

2. In a machine of the character described, a test lens holding means mounted to present a successive array of lenses of varying properties, a testing card in proper alinement with the line of vision as said lenses are successively presented, a rack on which said card is pivotally mounted, a slide member in which said rack is slidably mounted, means for sliding said rack back and forth, a finger projecting from said card, a shoulder element on said slide member against which said finger strikes when the card is moved rearwardly, and spring means for normally holding said card in an upright position.

In testimony whereof I affix my signature in presence of two witnesses.

SAMUEL C. BARR.

Witnesses:
 GARRETT S. CLAYPOOL,
 RUTH MAY.